(12) United States Patent
Bonte

(10) Patent No.: US 10,939,620 B2
(45) Date of Patent: Mar. 9, 2021

(54) AGRICULTURAL BALER

(71) Applicant: CNH Industrial America LLC, New Holland, PA (US)

(72) Inventor: Xavier G. J. M. Bonte, Zuidzande (NL)

(73) Assignee: CNH Industrial America LLC, New Holland, PA (US)

( * ) Notice: Subject to any disclaimer, the term of this patent is extended or adjusted under 35 U.S.C. 154(b) by 280 days.

(21) Appl. No.: 15/965,223

(22) Filed: Apr. 27, 2018

(65) Prior Publication Data

US 2018/0310483 A1    Nov. 1, 2018

(30) Foreign Application Priority Data

Apr. 27, 2017  (BE) .................................. 2017/5301

(51) Int. Cl.
*A01F 15/10*      (2006.01)
*A01F 15/08*      (2006.01)

(52) U.S. Cl.
CPC ........ *A01F 15/101* (2013.01); *A01F 15/0841* (2013.01); *A01F 2015/102* (2013.01)

(58) Field of Classification Search
CPC ................ A01F 15/101; A01F 15/0841; A01F 2015/102; A01D 89/00; A01D 89/001; A01D 89/005
USPC ..................................................... 100/188 R
See application file for complete search history.

(56) References Cited

U.S. PATENT DOCUMENTS

2012/0204740 A1   8/2012 Bergmann
2016/0192592 A1   7/2016 Dumarey et al.

FOREIGN PATENT DOCUMENTS

| EP | 0636308 A1 | 2/1995 | |
| EP | 1769674 A1 * | 4/2007 | .......... A01F 15/101 |
| WO | WO-2011012457 A1 * | 2/2011 | .......... A01F 15/101 |
| WO | 2012163903 A1 | 12/2012 | |

* cited by examiner

*Primary Examiner* — Shelley M Self
*Assistant Examiner* — Teresa A Guthrie
(74) *Attorney, Agent, or Firm* — Peter Zacharias; Patrick Sheldrake

(57) ABSTRACT

An agricultural baler including a bale case having a wall portion with an opening for introducing crop material; a plunger disposed moving in the bale case to compact the crop material into bales; a duct for transporting the crop material to the entrance opening; and a stuffer unit operably associated with the duct and including a fork assembly. The stuffer unit includes tines and a drive mechanism acting on the fork assembly. The drive mechanism includes a first drive member configured for a reciprocating motion along a path of movement; a second drive member configured for a reciprocating motion along the path of movement of the first drive member and operatively connected to the fork assembly; and a selectively operable coupling arrangement configured for selectively coupling the second drive member either to the first drive member or to a stationary part of the baler.

15 Claims, 6 Drawing Sheets

AGRICULTURAL BALER

FIELD OF THE INVENTION

The present invention relates to agricultural balers for the formation of bales of crop material, such as hay, straw or silage in a bale chamber, and more particularly to the loading means for the transportation of said material from within a duct to the bale chamber.

BACKGROUND OF THE INVENTION

In a conventional agricultural baler hay, straw, silage or similar crop material that has been previously cut, windrowed or swathed, is picked up from the ground by a pick-up unit, fed into a duct and loaded in successive batches or charges into an elongated bale chamber by tines of a stuffer unit in timed sequence with a reciprocating plunger. Such agricultural balers are also known as rectangular or square balers.

The plunger compresses the material into bales and, at the same time, gradually advances the bales towards the outlet of the bale chamber. As the bales reach a predetermined length as determined by a metering device, a knotter device is actuated which wraps cord, twine or other flexible binding material around the bale and secures the ends of the binding material together.

The sniffer unit is designed to quickly load charges of crop material into the bale chamber within the short interval during which the reciprocating plunger clears the entrance of the bale chamber. Typically this is accomplished by a fork assembly that comprises tines. A drive mechanism that is driven by a power source of the baler, acts on the fork assembly. When driven, the drive mechanism causes a movement of the tines along a path through the duct such that a charge of crop material that is located in the duct is engaged by the tines and loaded into the bale chamber. After loading the crop material into the bale chamber, the tines are moved out of the duct and returned towards the inlet of the duct such that the tines can be used for loading a subsequent charge of crop material into the bale chamber. The tines thus moved along a cyclic path. In the known balers of the above type the cyclic path is generally a kidney shaped path.

In known balers of the above type, the drive mechanism that acts upon the fork assembly is driven by the same power source that drives the plunger. Generally, the drive mechanism of the stuffer unit is coupled to a power take off of the main gearbox that drives the plunger, wherein the gearbox delivers rotational power to the drive mechanism. The drive mechanism subsequently converts the rotational power received from the gearbox, in particular received via one or more rotating output shafts of the gearbox, in a motion of the tines along the above referenced cyclic path. Generally, such drive mechanisms include arrangements for converting rotational motion received from the gearbox via a rotating input shaft into reciprocating motion of parts of the fork assembly. Such arrangements include for instance crank arms acting on the fork assembly via drive rods.

It is known to couple the drive mechanism of the stuffer unit to the power source of the baler with a selectively operable clutch assembly that is arranged and configured for selectively coupling a rotary output shaft of the gearbox to a rotary input shaft of the drive mechanism in order to allow for stopping the motion of the tines of the fork assembly. It is also known to couple the drive mechanism of the stuffer unit to the power source of the baler with a selectively operable clutch assembly that is arranged and configured for selectively coupling a rotary output shaft of the gearbox to a rotary input shaft of the drive mechanism in order to allow for changing the motion of the fork assembly. For instance in WO2012/163903 a drive mechanism of a stuffer unit is described that has two input shafts that are both driven for rotation by the gearbox of the baler. One of the input shafts is permanently connected to the gearbox, while the other input shaft is driven through a clutch that may be selectively disengaged. By engaging/disengaging the clutch the motion of the tines is changed, in particular the path of movement of the tines is changed.

Furthermore US 2012/204740 A1 discloses an agricultural piston bale press. The press includes a pressing piston arranged in a bale chamber, an intake device to take in crop material, and a stuffing device, wherein the stuffing device includes a feed passage and a stuffing mechanism, the stuffing mechanism includes an arm supporting tines, wherein said arm is movable by a first driving device to at least move the tines in and out of the feed passage and wherein said arm is pivotably supported by a fulcrum, the fulcrum being displaceable to selectively move the arm along the stuffing trajectory or load trajectory. The stuffing device includes a second driving device to displace the fulcrum, and the second driving device is mechanically independent of the main driving mechanism.

SUMMARY OF THE INVENTION

Embodiments of the present invention have as among others as its object to provide an advantageous alternative drive arrangement for a stuffer unit of a baler.

Thereto the present invention provides embodiments of an agricultural baler comprising a bale case, having a wall portion with an entrance opening for the introduction of crop material; a plunger, disposed for movement in the bale case to thereby compact said crop material into bales; a duct for the transportation of said crop material to said entrance opening; and a stuffer unit, operable associated with said duct and comprising a fork assembly. The stuffer unit comprises tines; and a drive mechanism acting on the fork assembly. The drive mechanism comprises: a first drive member configured for a reciprocating motion along a path of movement and operatively connected to a power source of the baler; a second drive member configured for a reciprocating motion along the path of movement of the first drive member and operatively connected to the fork assembly; and a selectively operable coupling arrangement configured for selectively coupling the second drive member either to the first drive member or to a stationary part of the baler.

In such embodiments of a baler according to the invention, a selectively operable coupling arrangement is arranged and configured for coupling and uncoupling reciprocating parts of the drive mechanism.

In a reciprocating motion the speed of the drive member that is being reciprocated is not constant, but is reduced while approaching the dead point of the reciprocating motion. The dead point is the point where the reciprocating motion changes from one direction into the opposite direction. By providing coupling and uncoupling of reciprocating parts of the drive mechanism, the coupling and uncoupling of the first drive member that is connected to a power source of the baler and the second drive member that is connected to the fork assembly can be effectuated at or near a dead point of the reciprocating motion of the first drive member.

At or near a dead point of the reciprocating motion of the first drive member the speed of the first drive member is reduced relative to the second drive member, which makes it easier to effectuate the coupling between the first drive member and the second drive member relative to the situation where coupling is effectuated while the first drive member is moved at constant speed. Furthermore, the forces acting on the second drive member and on the fork assembly connected thereto at the moment of coupling are reduced.

When the first drive member and the second drive member are coupled and move together, the speed of the first drive member and the second drive member is reduced when approaching a dead point of the reciprocating motion of the first drive member and the second drive member. At or near a dead point of the reciprocating motion of the first drive member and the second drive member, the speed of the first drive member and the second drive member is reduced relative to a stationary part of the baler, which makes it easier to effectuate the uncoupling of the first drive member and the second drive member and the coupling between the second drive member and the stationary second drive member relative to the situation where uncoupling/coupling is effectuated while the first drive member and the second drive member are moved at constant speed. Furthermore, the forces acting on the second drive member and on the stationary part of the baler at the moment of coupling are reduced.

In prior art drive mechanisms for a stuffer unit including a selectively operable coupling arrangement that is configured and arranged for coupling and uncoupling a rotating output shaft of the gearbox of the baler to a rotating input shaft of the drive mechanism, coupling and uncoupling under conditions of reduced speed and forces is only possible when stopping the rotation of the output shaft of the gearbox which would require an additional selectively operable coupling arrangement in the gearbox In a preferred embodiment of a baler according to the invention the first drive member is configured for continuous reciprocating motion along the path during operation of the baler. Thus an additional selectively operable coupling arrangement between the first drive member and the power source of the baler is not required.

In an advantageous embodiment of a baler according to the invention the selectively operable coupling arrangement is configured for coupling the second drive member either to the first drive member or to the stationary part of the baler when the first drive member is in one of the dead points of its reciprocating motion. In the dead point of the reciprocating motion, the speed of the first drive member is zero. Coupling the second drive member either to the first drive member or to the stationary part of the baler when the first drive member is in one of the dead points of its reciprocating motion thus allows for particularly easy coupling/uncoupling with particularly reduced forces.

In a further advantageous embodiment of a baler according to the invention the selectively operable coupling arrangement comprises: a first selectively operable set of two co-acting coupling members, one of the first set of coupling members being arranged on the second drive member and the other being arranged on a stationary part of the baler; a second selectively operable set of two co-acting coupling members, one of the second set of coupling members being arranged on the second drive member and the other being arranged on the first drive member; wherein the first set of two co-acting coupling members and the second set of coupling members are configured for synchronized operation.

In an advantageous embodiment thereof at least one of the sets of two co-acting coupling members is configured for positive coupling of the co-acting coupling members.

In an advantageous embodiment thereof for positive coupling one of the co-acting coupling members comprises a selectively operable hook and the other a hook engagement member configured to be positively engaged by the hook for coupling the co-acting coupling members.

In an advantageous embodiment thereof in both of the sets of two co-acting coupling members, one of the co-acting coupling members comprises a selectively operable hook, the hooks of the sets of coupling members are arranged on a shared support member that is pivotally arranged on the second drive about a pivot axis, the hook engagement members of the sets of coupling members are arranged on the stationary part of the baler and the first drive member, respectively; the shared support member is selectively pivotable about the pivot axis; and the hooks and hook engagement members are arranged such that by pivoting the shared support member one of the hooks is disengaged from the hook engagement member associated therewith while the other hook is engaged with the hook engagement member associated therewith.

In an advantageous embodiment according to the invention wherein the selectively operable coupling arrangement comprises a first and a second selectively operable set of two co-acting coupling members, at least one of the sets of two co-acting coupling members is configured for friction coupling of the co-acting coupling members.

In an advantageous embodiment thereof for friction coupling one of the co-acting coupling members comprises a selectively operable claw and the other a friction plate configured to be frictionally engaged by the claw for coupling the co-acting coupling members.

In a further advantageous embodiment of a baler according to the invention the first drive member and the second drive member are pivotally arranged on a frame part of the baler about the same pivot axis.

In an alternative embodiment thereof the first drive member and the second drive member are telescopically arranged.

In a further advantageous embodiment of a baler according to the invention the fork assembly comprises at least one fork lever having arranged thereon the tines; the fork lever is operable supported at a first pivot point and at a second pivot point; and the second drive member of the drive mechanism is operatively connected to the second pivot point to impose a reciprocating motion on the fork lever at the second pivot point. Preferably, the fork lever is acted upon at the first pivot point by a first crank arm that during operation of the baler is driven for rotation by the power source of the baler and that is arranged for imposing a circular movement on the first pivot point.

In a further advantageous embodiment of a baler according to the invention the first drive member of the drive mechanism is operatively connected to a second crank arm that during operation of the baler is driven for rotation by the power source of the baler and that is arranged for imposing on the first drive member the reciprocating motion along the path of movement of the first drive member.

In a further advantageous embodiment of a baler according to the invention the first drive member of the drive mechanism is operatively connected via a cam follower to a cam surface of a cam wheel, the cam surface preferably being provided by a closed cam track, wherein during operation of the baler the cam wheel is driven for rotation by the power source of the baler and is arranged for imposing on the first drive member the reciprocating motion along the path of movement of the first drive member.

In an advantageous embodiment thereof, the cam surface is arranged at the same radial distance from the axis of rotation of the cam wheel over a range of angular positions about the axis of rotation of the cam wheel; and the range of angular positions corresponds to one of the dead points of the reciprocating motion of the first drive member of the drive mechanism along its path of movement.

BRIEF DESCRIPTION OF THE FIGURES

The accompanying drawings are used to illustrate non-limitative preferred exemplary embodiments of the present invention. The above stated and other advantages, features and objectives of the invention will become more apparent, and the invention better understood, from the following detailed description when read in combination with the accompanying drawings, in which.

Terms such as "forward", "rearward", "left", "right", etc., when used in connection with the baler and/or components thereof are determined with reference to, and facing in, the direction of operative travel of the baler in the field.

DETAILED DESCRIPTION OF THE FIGURES

Figure 1:
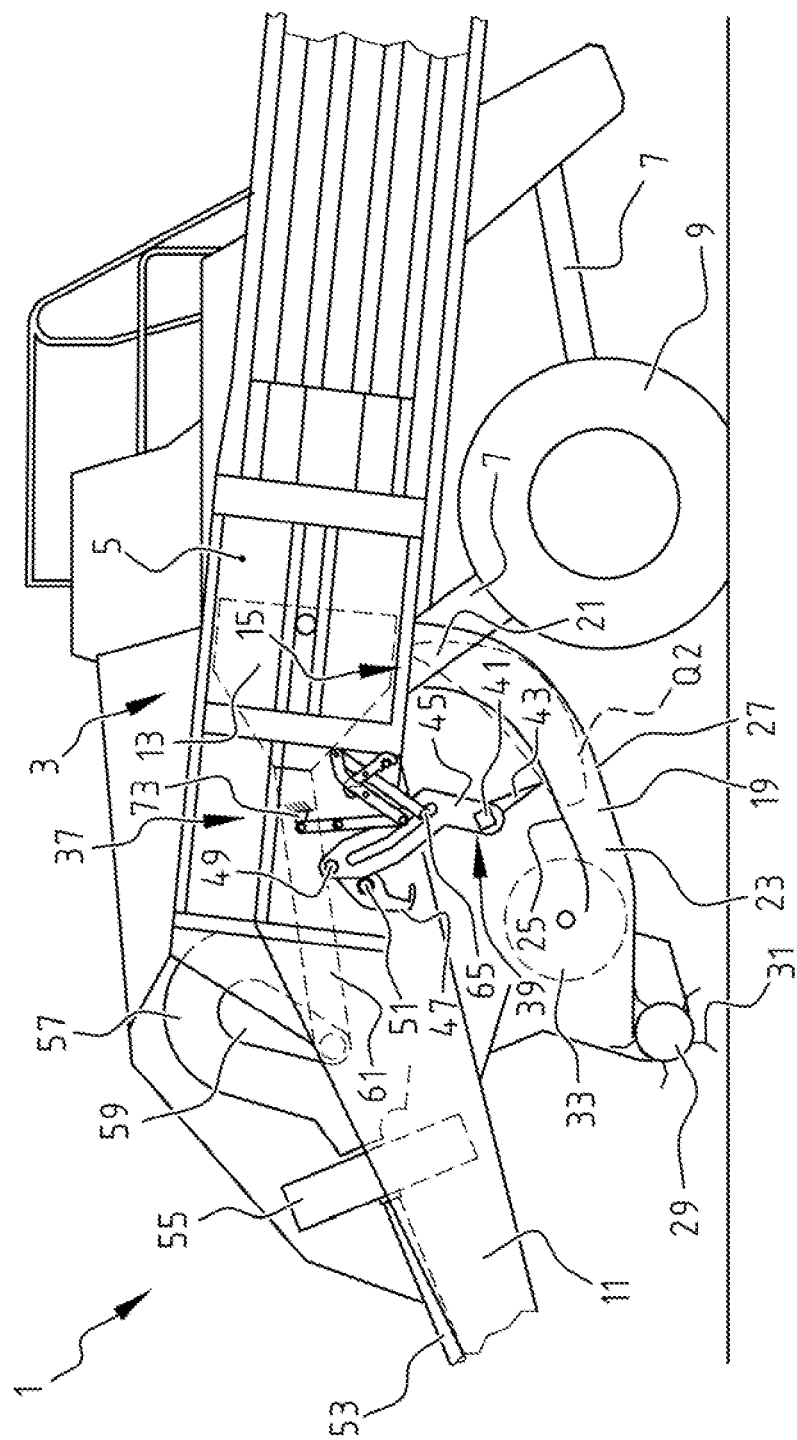
FIG. 1 shows a fragmentary, schematic side view of an embodiment of a baler according to the invention having a stuffer unit.

In FIG. 1 a baler 1 is illustrated having a fore-and-aft extending bale case 3 with a rectangular cross section defining a baling chamber 5. The bale case 3 is supported in an upwardly and forwardly inclined manner by struts 7 having ground-engaging wheels 9 at their lowermost ends. A downwardly and forwardly projecting tongue 11 at the front of the bale case 3 is adapted for hitching the baler 1 to a towing vehicle (not shown) for advancing the same across a field. An enclosed plunger 13 reciprocates fore-and-aft within the baling chamber for periodically compacting material presented to the chamber 5 through an inlet 15 in the floor of bale case 3 across the full width thereof.

An upwardly curving loading duct 19 depends from the bale case 3 and has its upper discharge end 21 in registration with the inlet 15, while the lower receiving end 23 of the duct 19 is remote from inlet 15 and is disposed substantially forwardly thereof. The duct 19 has a curved top wall 25 which is provided with laterally spaced, longitudinal slots (not shown) extending the full length thereof, and a solid curved bottom wall 27.

The lower end 23 of the duct 19 is positioned directly behind a crop pick-up 29 which may be of any design capable of picking up windrowed or swathed crop material from the field and delivering the same rearwardly into the end 23 of the duct 19. In the illustrated embodiment, the pick-up 29 has a series of lifting tines 31 which sweep the crop upwardly to a rotor feeder 33 which feed the crop rearwardly into the lower end 23 of the duct 19.

A stuffer unit 37 is positioned behind the rotor feeder 33 and above the duct 19. The stuffer unit 37 has a fork assembly 39. The fork assembly 39 has a transverse tube 41 spanning the duct 19 above the latter, to which tube 41 a series of laterally spaced-apart, elongated tines 43 is attached. The fork assembly 39 also includes a pair of fork levers 45 at opposite ends of the tube 41, which levers 45 carry the tube 41 at their rearmost end and are rotatably coupled at their foremost end with a pair of crank arms 47 through pivots 49. The crank arms 47 are rigidly affixed to opposite ends of a support shaft 51 that spans the bale case 3.

A power input shaft 53 along the tongue 11 carries a flywheel 55 at the upper end of said tongue 11, immediately adjacent a right angle gearbox 57. The gearbox 57 drives a pair of crank arms 59 which are rotatably linked to a pair of connecting rods 61 of the plunger 13. When rotating power from the towing vehicle is supplied to the input shaft 53, the gearbox 57 rotates the crank arms 59 to thereby reciprocate the plunger 13 within the bale case 3. The same gearbox 57 provides either directly or indirectly driving power to the fork arrangement 39. In particular the crank arms 47 of the stuffer unit 37 are rotated about an axis of rotation r1 when receiving driving power from the gearbox 57.

The fork lever 45 is operably supported by a guide 63 that allows relative movement of the fork lever 45 to a second pivot point 65 along a predetermined path relative to the lever 45. The guide 63 comprises a journal 67, coaxial with the second pivot point 65 and cooperating with an oblong slot 69 provided in the fork lever 45. The journal 67 fits closely between the longitudinal sides of the slot 69. Upon rotation of the crank arm 47 about its axis of rotation R1 in the direction of arrow A, the second pivot point 65 travels to and fro along a line L relative to and within the slot 69, resulting in the tines 43 being moved along the kidney shaped path of movement. The tines 43 are spaced apart in accordance with the slots in the top wall 25 of duct 19, such that while moved along the kidney shaped path of movement, the tines 43 may enter the duct 19 through said slots and move along the bottom wall 27 toward the inlet 15 of the bale case 3.

The stuffer unit 37 provides two modes of operation.

Figure 2:
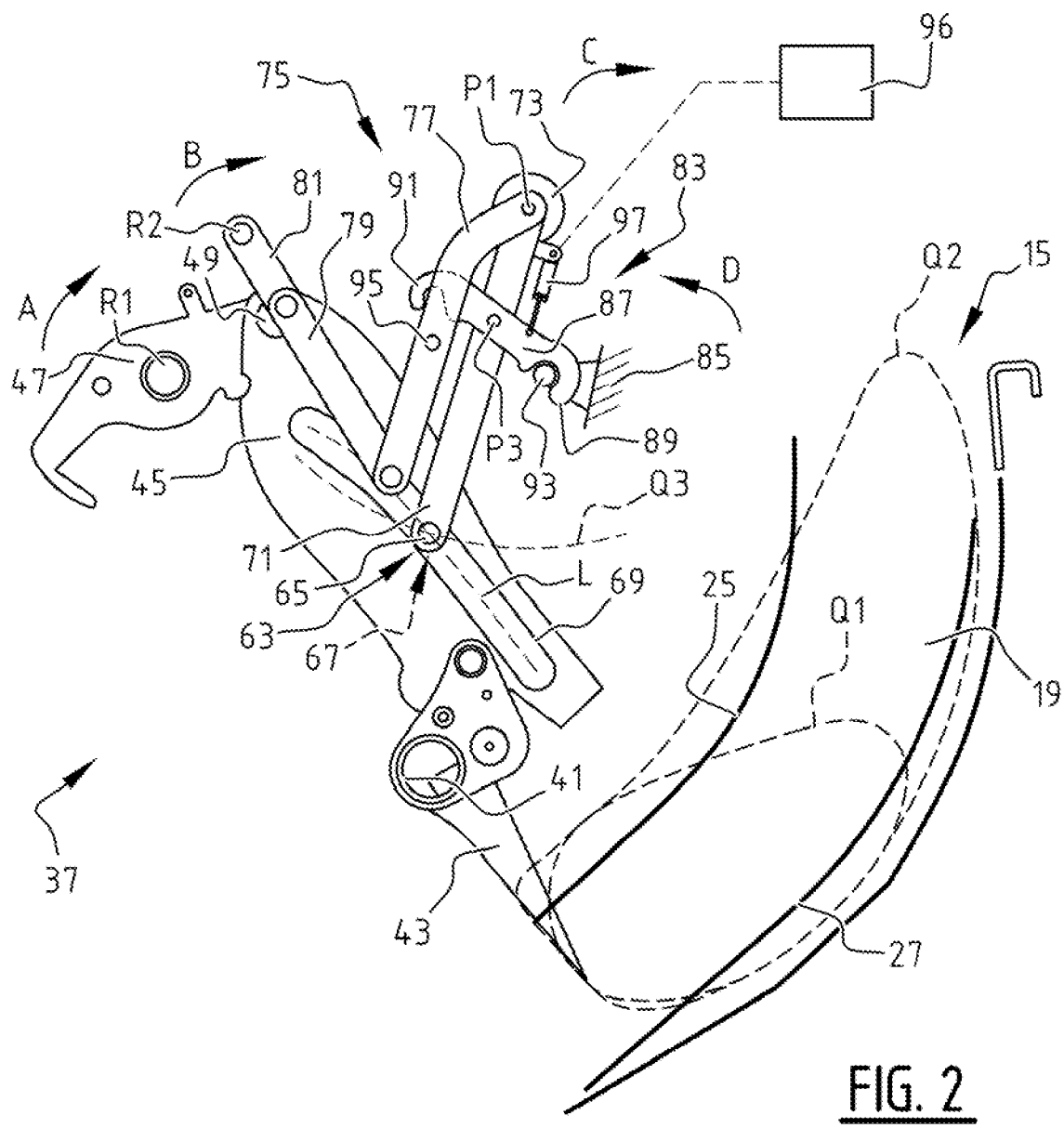
FIGS. 2 and 3 show a schematic side view of the stuffer unit of the baler of FIG. 1 having a first embodiment of a drive mechanism.

When the crank arms 47 of the stuffer unit 37 are rotated about an axis of rotation R1 in the direction of arrow A with the second pivot point 65 being held stationary in the position shown in FIG. 2, the tines 43 are moved along a path of movement Q1. While being moved along the path of movement Q1 the tines 43 accumulate material in the duct 19. The stuffer unit 37 is then in a packer mode.

As shown in FIG. 2, the journal 67 that is coaxial with the second pivot point 65, is arranged on a guide member 71 that is arranged pivotally about a pivot axis P1 on a stationary part of the frame 73 of the baler 1. When the first guide member 71 is pivoted about the pivot axis P1, the second pivot point 65 is moved along a circular path of movement Q3. When the crank arms 47 of the stuffer unit 37 are rotated about the axis of rotation R1 in the direction of arrow A while the second pivot point 65 is caused to make a reciprocating motion along the path of movement Q3, the tines 43 are moved along a path of movement Q2. While being moved along a path of movement Q2 the tines 43 push material that is accumulated in the duct 19 in upward direction in the baling chamber 5 via the inlet 15 of the baling chamber. The stuffer unit is then in a stuffer mode.

In FIG. 2 a first embodiment of a drive mechanism is shown that allows for holding the second pivot point 65 stationary in order to provide the packer mode, that allows for moving the second pivot point 65 along a circular path of movement Q3 in order to provide the stuffer mode, and that allows for switching between the packer mode and the stuffer mode.

The shown drive mechanism 75 comprises a first drive member 77 that is arranged pivotally about the pivot axis P1 on a stationary part of the frame 73 of the baler 1 and a second drive member embodied by the guide member 71. The first drive member 77 and the second drive member 71 are thus both pivotable about the pivot axis P1, and thus are moved along the same path of movement, herein referred to as an angular path of movement when pivoted about the pivot axis P1. Points on the first drive member 77 and on the second drive member 71 that are located at the same distance to the pivot axis p1 are moved along the same path of movement when the first drive member 77 and the second drive member 71 are pivoted about the pivot axis P1.

The first drive member 77 is operatively connected by means of a drive rod 79 to a second crank arm 81 that during operation of the baler 1 is continuously driven for rotation about axis of rotation R2 via the gear box 57 of the baler 1. Rotation of the second crank arm 81 about axis of rotation R2 imposes a reciprocating motion on the first drive member 77 along the path of movement of the first drive member 77 about the pivot axis P1. The second drive member that is embodied by the guide member 71 has arranged thereon the journal 67 that is coaxial with the second pivot point 65.

The drive mechanism 75 is further provided with a selectively operable coupling arrangement 83. The selectively operable coupling arrangement 83 is configured for selectively coupling the second drive member embodied by the guide member 71 either to the first drive member 77 or to a stationary frame part 85 of the baler 1. The coupling arrangement 83 comprises a support member 87 that is pivotally arranged on the guide member 71 about pivot axis P3. Arranged at opposite ends of the support member 87 on opposite sides of the pivot axis P3 are a first hook 89 and a second hook 91, respectively. In the position of the support member 87 shown in FIG. 2, the first hook 89 is in engagement with a first hook engagement member embodied by a first pin 93 that is arranged on the stationary frame part 85 of the baler 1. Thus the guide member 71 is coupled to a stationary part of the frame of the baler 1. In FIG. 2, the first drive member 77 is positioned in one of the dead points of the reciprocating motion imposed on the first drive member 77. A second hook engagement member embodied by a second pin 95 is arranged on the first drive member 77. In the position of the support member 87 shown in FIG. 2 the second hook 91 is not in engagement with the second pin 95. Further rotation of the second crank arm 81 about axis of rotation R2 in the direction of arrow B results in the first drive member 77 to be moved in the direction of arrow C about pivot axis P1, while the guide member 71 remains coupled to the stationary part of the frame 73 of the baler 1. Thus, when in the shown situation the first crank arm 47 and the second crank arm 81 are rotated about their respective axis of rotation R1, R2, the second pivot point 65 is held stationary such that the stuffer unit 37 operates in the packer mode as described herein above.

Figure 3:
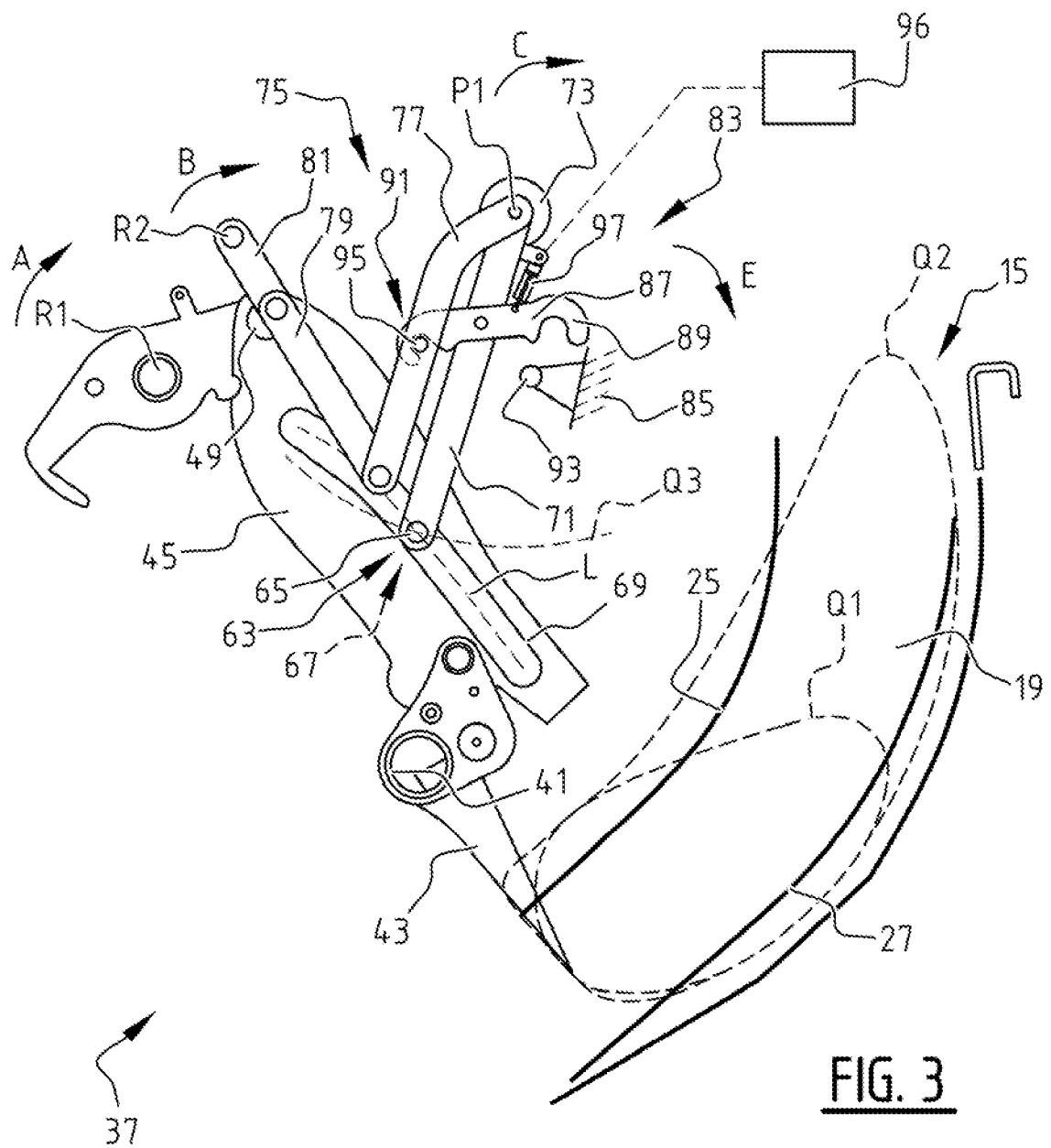

With the first drive member 77 positioned in the dead point of the reciprocating motion imposed on the first drive member 77 as shown in FIG. 2 and the support member 87 in the position as shown in FIG. 2, the support member 87 can be pivoted about the pivot axis P3 in the direction of arrow D by means of an actuator. By pivoting the support member 87, the first hook 89 is disengaged from the first pin 93, such that the guide member 71 is no longer coupled to the stationary part 85 of the frame. At the same time pivoting of the support member 87 causes the second hook 91 to engage the second pin 95, such that, as shown in FIG. 3, the guide member 71 is coupled to the first drive member 77. When in the situation shown in FIG. 3 the second crank arm 81 is rotated about the axis of rotation R2 in the direction of arrow B, the guide member 71 and the first drive member 77 are both pivoted about the pivot axis P1, such that a reciprocating motion along the path of movement Q3 is imposed on the second pivot point 65. Thus when in the situation shown in FIG. 3 the first crank arm 47 and the second crank arm 81 are rotated about their respective axis of rotation r1, r2, the second pivot point 65 is moved along the path of movement Q3 in a reciprocating motion, such that the stuffer unit 37 operates in the stuffer mode as described herein above. Subsequently, the stuffer unit 37 can be switched back in the packer mode by pivoting the support member 87 back in the direction of arrow E when the first drive member 77 is in the dead point of its reciprocation motion shown in FIG. 3. Pivoting the support member 87 back in the direction of arrow E, causes the second hook 91 to be disengaged from the second pin 95, while at the same time the first hook 89 is caused to engage the first pin 93. As shown, an actuator for selectively pivoting the support member 87 is for instance a linear actuator, in particular a work cylinder 97 that is controlled by a controller 96 of the baler 1. Alternatively, the actuator is a rotary actuator (not shown). Such a rotary actuator is for instance an electric, hydraulic, or pneumatic motor that provides rotary motion at its output shaft, wherein the output shaft is connected to the support member 87 via a transmission, for instance a set of gear wheels, such that the support member 87 is pivotable about is pivot-axis P3 by transmitting rotary motion from the motor output shaft to the support member 87.

In FIGS. 2 and 3, the actuator, in the shown embodiment the work cylinder 97, is at one end connected to the guide member 71 and is at its opposite end connected to the support member 87. Alternatively, the actuator is at one end connected to a part of the frame of the baler 1 and is at its opposite end not connected to the support member 87, but configured to engage and pivot the support member 87 when the guide member 71 is in the position shown in FIGS. 2 and 3.

The second crank arm 81 is during operation of the baler 1 continuously driven for rotation about axis of rotation R2 via the gear box 57 of the baler 1. Thus the first drive member 77 is continuously moved along the path of movement thereof in a reciprocating motion. As described herein above switching between the packer mode and the stuffer mode and vice versa is effectuated when the first drive member 77 is in a dead point of the reciprocating motion imposed thereon. In the dead point the direction of movement of the first drive member 77 is changed into the opposite direction and the speed of the first drive member 77 is reduced to zero, which allows for causing the first hook 89 and the second hook 91 to engage or disengage the first pin 93 and the second pin 95 under substantially stationary conditions.

Figure 4:
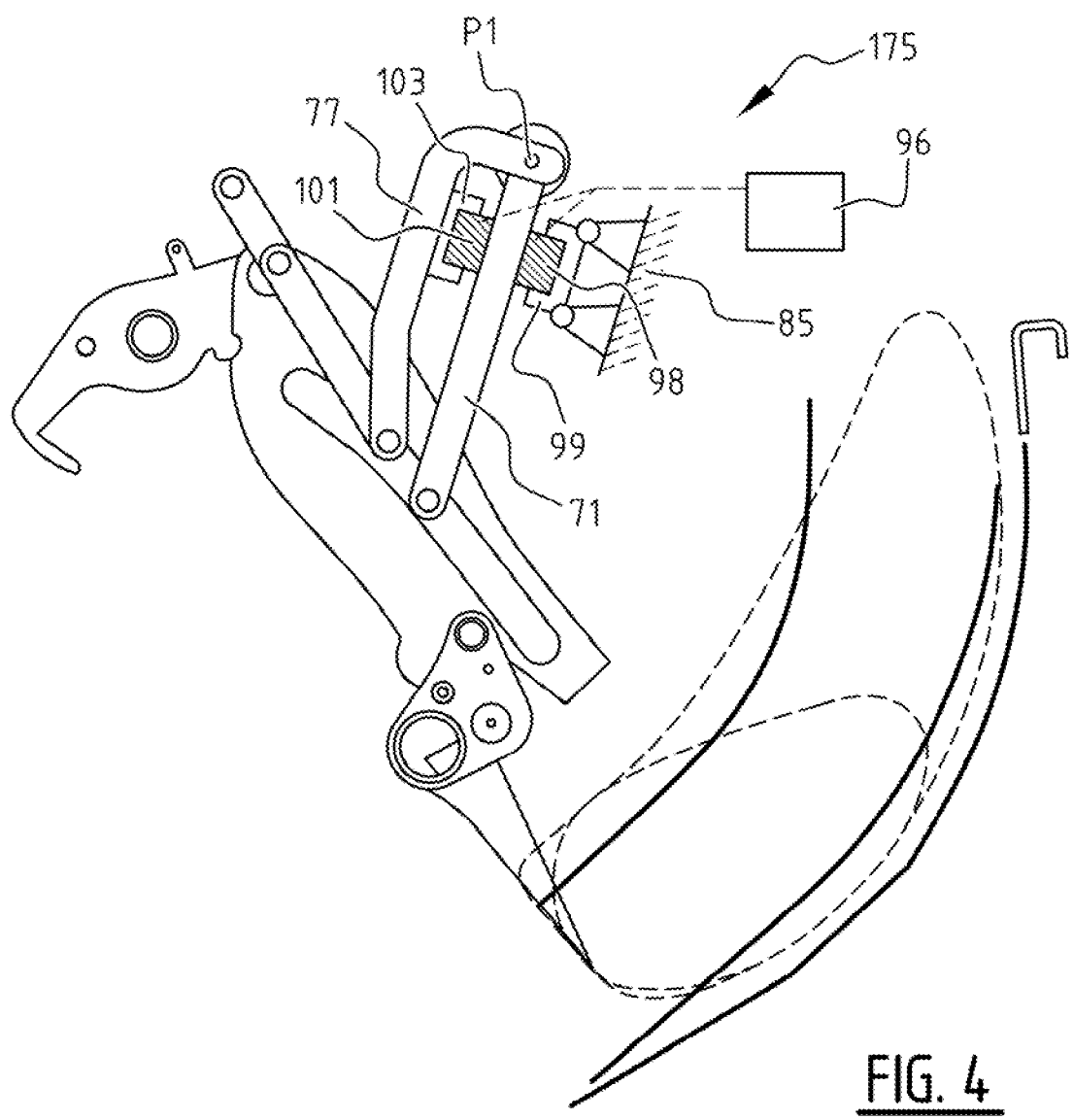
FIG. 4 shows a schematic side view of the stuffer unit of the baler of FIG. 1 having a second embodiment of a drive mechanism.

The first hook 89 and second hook 91 provide positive coupling. In an alternative embodiment of the drive mechanism shown in FIGS. 2 and 3, friction coupling is used, in stead of positive coupling, for coupling the second drive member embodied by the guide member 71 either to the stationary part 85 of the frame of the baler or to the first drive member 77. In such embodiment of a drive mechanism 175, shown in FIG. 4, the co-acting coupling members embodied by the first hook 89 and the first pin 93 as well as the co-acting coupling members embodied by the second hook 91 and the second pin 95, are replaced with a respective set of co-acting coupling members embodied by a selectively operable claw and a friction plate configured to be frictionally engaged by the claw. A first selectively operable claw 98 is arranged on the guide member 71, while a first friction plate 99 is arranged on the stationary part 85 of the frame of the baler 1. A second selectively operable claw 101 is arranged on the guide member 71, while a second friction plate 103 is arranged on the first drive member 77. In the situation shown in FIG. 4, with the first drive member 77 in a dead point of the reciprocating motion imposed thereon, the first selectively operable claw 98 can be operated to engage the first friction plate 99 in order to couple the guide member 71 to the stationary part 85 of the frame of the baler 1. Alternatively, the second selectively operable claw 101 can be operated to engage the second friction plate 103 in order to couple the guide member 71 to the first drive member 77. Both the first selectively operable claw 98 and the second selectively operable claw 101 are controlled by a controller 96 of the baler 1. The controller 96 is configured for synchronized operation of the first claw 98 and the second claw 101, and to operate the first claw 98 and the second claw 101 such that either the first claw 98 engages the first friction plate 99 or the second claw 101 engages the second friction plate 103.

Figure 5:
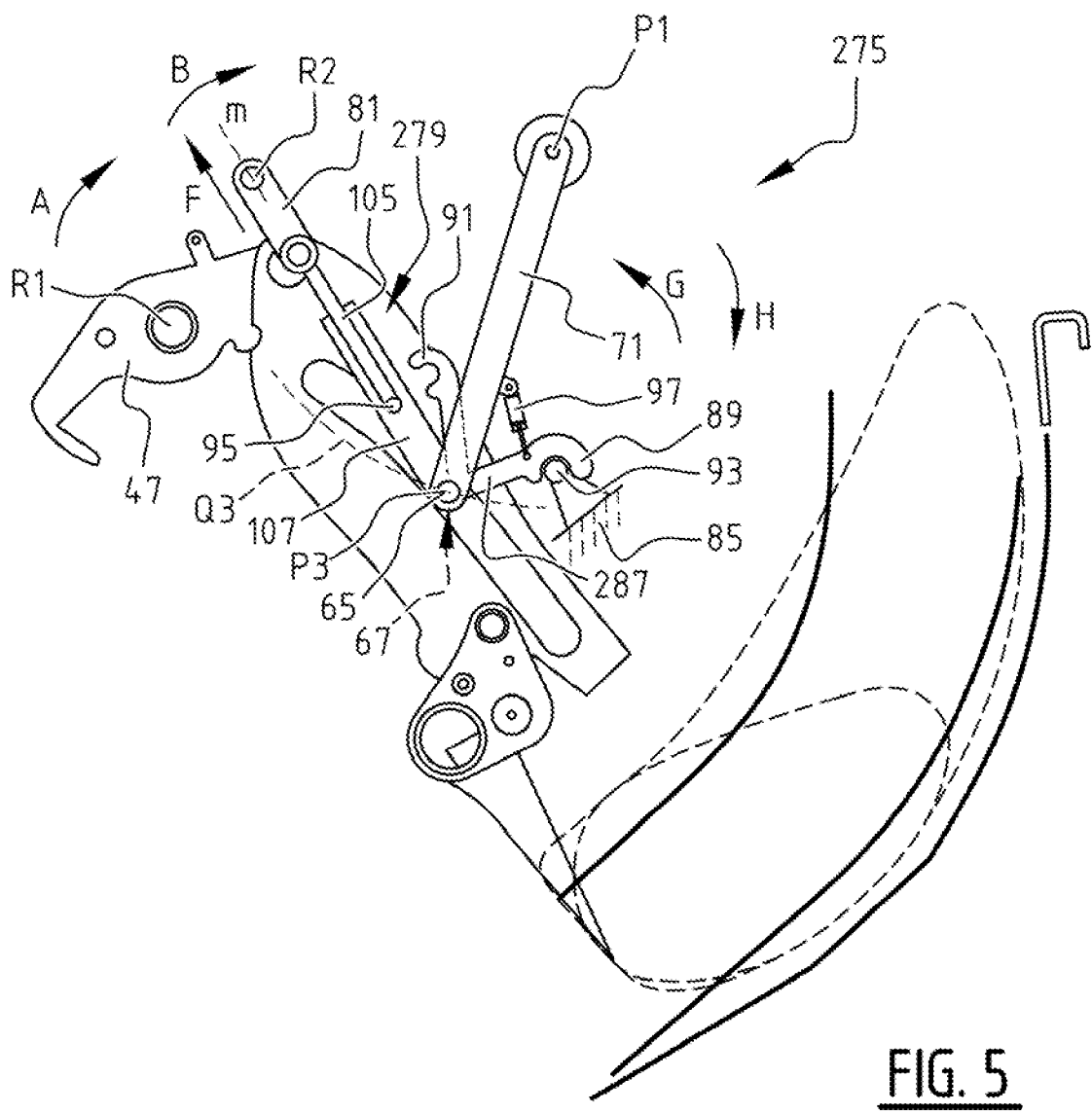
FIG. 5 shows a schematic side view of the stuffer unit of the baler of FIG. 1 having a third embodiment of a drive mechanism.

In a further alternative embodiment of the drive mechanism shown in FIGS. 2 and 3, the first drive member and the second drive member are alternatively embodied. In FIG. 5 such an embodiment of a drive mechanism 275 is shown. As in the embodiment shown in FIGS. 2 and 3, the journal 67 that is coaxial with the second pivot point 65, is arranged on a guide member 71 that is arranged pivotally about a pivot axis P1 on a stationary part of the frame 73 of the baler 1. However, in the drive mechanism 275, the guide member 71 does not embody the second drive member. In stead a telescopic drive rod 279 is provided that connects the second crank arm 81 to the guide member 71. The telescopic drive rod 279 has a first part 105 that is connected to the second crank arm 81 and a second part 107 that is connected to the guide member 71. The first part 105 and the second part 107 are telescopically arranged, such that the first part 105 and the second part 107 can move relative to each other along a path parallel to the central longitudinal axis m of the drive rod 279. The first part 105 embodies the first drive member, while the second part 107 embodies the second drive member of the drive mechanism 275. The support member 287 having arranged thereon the first hook 89 and second hook 91, is pivotally arranged on the guide member 71 about pivot axis P3 that is co-axial with the journal 67 and the second pivot point 65. As in the embodiment shown in FIGS. 2 and 3, the first hook engagement member embodied by the first pin 93 is arranged on the stationary part 85 of the frame of the baler 1, while the second hook engagement member embodied by the second pin 95 is arranged on the first drive member 105.

In the position of the support member 87 shown in FIG. 5, the first hook 89 is in engagement with the first pin 93. Thus the second drive member 107 and the guide member 71 are coupled to a stationary part of the frame of the baler 1. The second hook 91 is not in engagement with the second pin 95. Further rotation of the second crank arm 81 about axis of rotation R2 in the direction of arrow B results in the first drive member 105 to be moved in the direction of arrow F, while the second drive member 107 remains coupled to the stationary part 85 of the frame of the baler 1. Thus the first drive member 105 is moved relative to the second drive member 107 along a path parallel to the longitudinal axis m of the drive rod 279 in a reciprocating motion. When in the shown situation the first crank arm 47 and the second crank arm 81 are rotated about their respective axis of rotation R1, R2, in the respective directions A and B, the second pivot point 65 is held stationary, such that the stuffer unit 37 operates in the packer mode as described herein above.

With the first drive member 105 positioned in the dead point of the reciprocating motion imposed on the first drive member 105 as shown in FIG. 5 and the support member 287 in the position as shown in FIG. 5, the support member 287 can be pivoted about the pivot axis P3 in the direction of arrow G by means of an actuator 97. By pivoting the support member 287, the first hook 89 is disengaged from the first pin 93, such that the second drive member 107 and the guide member 71 are no longer coupled to the stationary part 85 of the frame. At the same time pivoting of the support member 287 causes the second hook 91 to engage the second pin 95, such that the second drive member 107 and the guide member 71 are coupled to the first drive member 105. When in that situation the second crank arm 81 is rotated about the axis of rotation R2 in the direction of arrow B, the guide member 71 is pivoted about the pivot axis P1, such that a reciprocating motion along the path of movement Q3 is imposed on the second pivot point 65. Thus when in that situation the first crank arm 47 and the second crank arm 81 are rotated about their respective axis of rotation R1, R2, in the respective directions A and B, the second pivot point 65 is moved along the path of movement Q3 in a reciprocating motion, such that the stuffer unit 37 operates in the stuffer mode as described herein above. Subsequently, the stuffer unit 37 can be switched back in the packer mode by pivoting the support member 287 back in the direction of arrow H when the guide member 71 is in the dead point of its reciprocation motion shown in FIG. 5. Pivoting the support member 287 back in the direction of arrow H, causes the second hook 91 to be disengaged from the second pin 95, while at the same time the first hook 89 is caused to engage the first pin 93.

Figure 6:
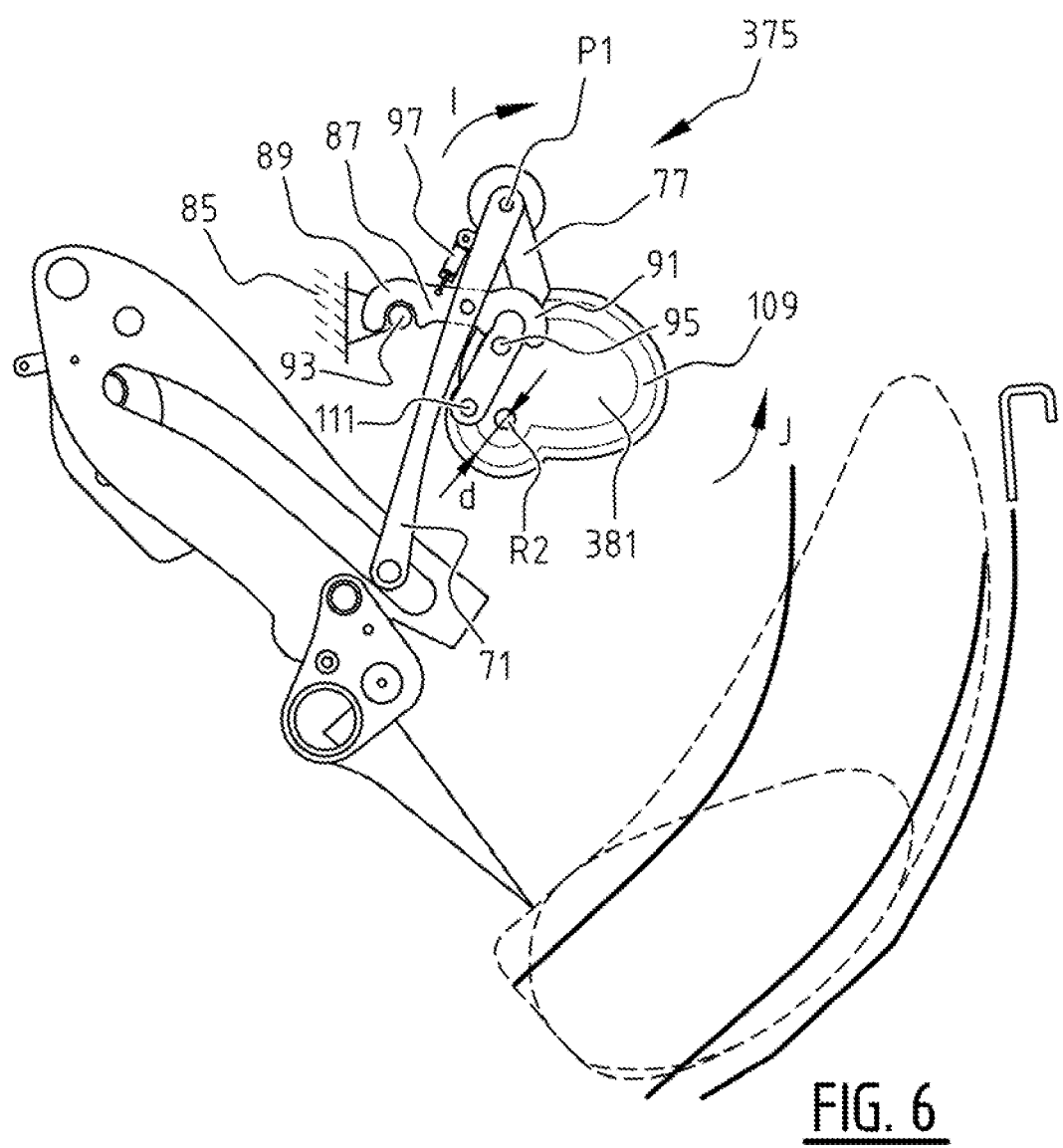
FIG. 6 shows a schematic side view of the stuffer unit of the baler of FIG. 1 having a fourth embodiment of a drive mechanism.

In a further alternative embodiment of the drive mechanism shown in FIGS. 2 and 3, the second crank arm 81 and drive rod 79 are replaced with a camtrack/camtrack follower arrangement. In such an embodiment shown in FIG. 6 a cam wheel 381 is continuously driven for rotation about the axis of rotation R2 with rotational power provided by the gearbox 57. The cam wheel 381 is provided with a closed cam track 109. A cam track follower 111 is arranged on the first drive member 77 and is engaged by the cam track 109. When the cam wheel 381 is driven for rotation about the axis of rotation R2, the cam track follower 111 follows the cam track 109. Rotation of the cam wheel 381 about axis of rotation R2 in the direction of arrow J imposes a reciprocating motion on the first drive member 77 along the path of movement of the first drive member 77 about the pivot axis P1. In FIG. 6, the first drive member 77 is in the dead point of the reciprocating motion imposed thereon. In the dead point the support member 87 that is arranged on the guide member 71 can be pivoted in the direction of arrow I in order to cause the first hook 89 to disengage the first pin 93 and to cause the second hook 91 to engage the second pin 95 that is arranged on the first drive member 77. As shown the cam surfaces provided by the cam track 109 are arranged at a constant radial distance d from the axis of rotation R2 of the cam wheel 381 over a range of angular positions about the axis of rotation R2 of the cam wheel 381. As a result, the amount of time that the first drive member 77 remains in its dead point is increased relative to the crank arm/drive rod arrangement of FIGS. 2 and 3, thereby increasing the time that is available for pivoting the support member 87 and engaging/disengaging the first hook 89 and second hook 91. The camtrack/camtrack follower arrangement of this embodiment can also be used in the embodiment shown in FIG. 4 as a replacement for the second crank arm 81 and drive rod 79.

Although the principles of the invention have been set forth above with reference to specific embodiments, it must be understood that this description is given solely by way of example and not as limitation to the scope of protection, which is defined by the appended claims.

What is claimed is:

1. An agricultural baler comprising:
    a bale case having a wall portion with an entrance opening for introducing crop material;
    a plunger disposed for movement in the bale case to compact the crop material into bales;
    a duct for transporting the crop material to the entrance opening; and
    a stuffer unit operably associated with the duct, the stuffer unit comprising:
        a fork assembly comprising tines;
        a drive mechanism acting on the fork assembly, the drive mechanism comprising:
            a first drive member configured for a reciprocating motion along a path of movement and operatively connected to a power source of the baler;
            a second drive member configured for a reciprocating motion along the path of movement of the first drive member and operatively connected to the fork assembly; and
            a selectively operable coupling arrangement directly coupled to the second drive member and configured for selectively coupling the second drive member either:
                to the first drive member; or
                to a stationary part of the baler,
            wherein when the second drive member is coupled to the first drive member, the first drive member and the second drive member move relative to the stationary part of the baler, and
            wherein when the second drive member is coupled to the stationary part of the baler, the second drive member is stationary relative to the stationary part of the baler.

2. The agricultural baler according to claim 1, wherein the first drive member is configured for continuous reciprocating motion along the path of movement during operation of the baler.

3. The agricultural baler according to claim 1, wherein the selectively operable coupling arrangement is configured for switching the coupling of the second drive member from the first drive member to the stationary part or from the stationary part of the baler to the first drive member when the first drive member is in a dead point of its reciprocating motion.

4. The agricultural baler according to claim 1,
    wherein the selectively operable coupling arrangement comprises:
        a first selectively operable set of two co-acting coupling members, one of the first selectively operable set of two co-acting coupling members being arranged on the second drive member and the other being arranged on the stationary part of the baler, and
        a second selectively operable set of two co-acting coupling members, one of the second selectively operable set of two co-acting coupling members being arranged on the second drive member and the other being arranged on the first drive member, and
    wherein the first selectively operable set of two co-acting coupling members and the second selectively operable set of two co-acting coupling members are configured for synchronized operation.

5. The agricultural baler according to claim 4, wherein at least one of the first and second selectively operable sets of two co-acting coupling members is configured for positive coupling of its two co-acting coupling members.

6. The agricultural baler according to claim 5, wherein, for positive coupling, the two co-acting coupling members of the at least one of the first and second selectively operable sets comprise a selectively operable hook and an hook engagement member configured to be positively engaged by the hook for coupling the two co-acting coupling members of the at least one of the first and second selectively operable sets.

7. The agricultural baler according to claim 5, wherein:
    in both of the first and second selectively operable sets of two co-acting coupling members one of the two co-acting coupling members comprises a selectively operable hook and the other of the two co-acting coupling members comprises a hook engagement member,
    the hooks of the first and second selectively operable sets of coupling members are arranged on a shared support member that is pivotally arranged on the second drive member about a pivot axis,
    the hook engagement members of the first and second selectively operable sets of coupling members are arranged on the stationary part of the baler and the first drive member, respectively,
    the shared support member is selectively pivotable about the pivot axis, and
    the hooks and hook engagement members are arranged such that by pivoting the shared support member one of the hooks is disengaged from the hook engagement member associated therewith while the other hook is engaged with the hook engagement member associated therewith.

8. The agricultural baler according to claim 4, wherein at least one of the first and second selectively operable sets of two co-acting coupling members is configured for friction coupling of its co-acting coupling members.

9. The agricultural baler according to claim 8, wherein, for friction coupling, one of the co-acting coupling members comprises a selectively operable claw and the other comprises a friction plate configured to be frictionally engaged by the claw for coupling the co-acting coupling members.

10. The agricultural baler according to claim 1, wherein the first drive member and the second drive member are pivotally arranged on a frame part about the same pivot axis.

11. The agricultural baler according to claim 1, wherein the first drive member and the second drive member are telescopically arranged.

12. The agricultural baler according to claim 1, wherein:
    the fork assembly further comprises at least one fork lever having arranged thereon the tines,
    the fork lever is operably supported at a first pivot point and at a second pivot point, and
    the second drive member of the drive mechanism is operatively connected to the second pivot point to impose a reciprocating motion on the fork lever at the second pivot point.

13. The agricultural baler according to claim 1, wherein the first drive member of the drive mechanism is operatively connected to a crank arm that during operation of the baler is driven for rotation by the power source of the baler and that is arranged for imposing on the first drive member the reciprocating motion along the path of movement of the first drive member.

14. The agricultural baler according to claim 1, wherein the first drive member of the drive mechanism is operatively connected via a cam follower to a cam surface of a cam wheel, wherein during operation of the baler the cam wheel is driven for rotation by the power source of the baler and is arranged for imposing on the first drive member the reciprocating motion along the path of movement of the first drive member.

15. The agricultural baler according to claim 14, wherein:
   the cam surface is arranged at a same radial distance from an axis of rotation of the cam wheel over a range of angular positions about the axis of rotation of the cam wheel; and
   the range of angular positions corresponds to the dead point of the reciprocating motion of the first drive member of the drive mechanism along its path of movement.

\* \* \* \* \*